(12) United States Patent
Cote

(10) Patent No.: US 11,116,183 B2
(45) Date of Patent: Sep. 14, 2021

(54) BIRD FEEDER WITH ADJUSTABLE SHROUD

(71) Applicant: Paul L. Cote, Lac Brome (CA)

(72) Inventor: Paul L. Cote, Lac Brome (CA)

( * ) Notice: Subject to any disclaimer, the term of this patent is extended or adjusted under 35 U.S.C. 154(b) by 272 days.

(21) Appl. No.: 16/501,033

(22) Filed: Feb. 11, 2019

(65) Prior Publication Data

US 2020/0253166 A1 Aug. 13, 2020

(51) Int. Cl.
*A01K 39/01* (2006.01)
*A01K 39/012* (2006.01)

(52) U.S. Cl.
CPC ........ *A01K 39/0113* (2013.01); *A01K 39/012* (2013.01)

(58) Field of Classification Search
CPC ........................ A01K 39/0113; A01K 5/0142
USPC ....................................................... 119/57.9
See application file for complete search history.

(56) References Cited

U.S. PATENT DOCUMENTS

| | | | | |
|---|---|---|---|---|
| 4,361,116 A * | 11/1982 | Kilham | ................ | A01K 39/014 119/51.01 |
| 5,195,459 A * | 3/1993 | Ancketill | ........... | A01K 39/0113 119/52.3 |
| 6,253,707 B1 * | 7/2001 | Cote | .................. | A01K 39/0106 119/57.9 |
| 6,543,384 B2 * | 4/2003 | Cote | .................. | A01K 39/0113 119/57.9 |
| 6,918,353 B1 * | 7/2005 | Coroneos | ........... | A01K 39/0113 119/52.3 |
| 7,191,731 B2 * | 3/2007 | Cote | .................. | A01K 39/0113 119/57.9 |
| 7,992,520 B2 * | 8/2011 | Lush | ..................... | A01K 39/012 119/57.9 |
| 8,230,809 B2 * | 7/2012 | Cote | .................. | A01K 39/0113 119/52.3 |
| 2008/0105206 A1 * | 5/2008 | Rich | .................. | A01K 39/0113 119/57.9 |
| 2010/0258055 A1 * | 10/2010 | Cote | .................. | A01K 39/0113 119/52.3 |
| 2011/0126771 A1 * | 6/2011 | Cote | .................. | A01K 39/0113 119/52.3 |
| 2012/0073505 A1 * | 3/2012 | Cote | .................. | A01K 39/0106 119/51.03 |
| 2014/0060438 A1 * | 3/2014 | Cote | .................. | A01K 39/0113 119/51.01 |
| 2015/0305311 A1 * | 10/2015 | Murray | .............. | A01K 39/0113 119/57.9 |

(Continued)

*Primary Examiner* — Timothy D Collins
*Assistant Examiner* — Madeline L Douglas
(74) *Attorney, Agent, or Firm* — Andrews Robichaud PC; Alessandro Colonnier

(57) ABSTRACT

A bird feeder which comprises a seed container having at least one seed port to permit birds to have access to seed, a shroud extending about the seed port, a base member being secured to the seed container, a hollow tube extending upwardly from the base member and being located internally of the seed container, a rod extending within the hollow tube and a spring extending about a portion of the rod, the rod having a flange extending outwardly to bias a first end of the spring, an insert secured to the base member, the insert extending upwardly into the hollow tube with a second end of the spring being biased against the insert, the rod having a lower end secured against a bottom portion of the shroud.

9 Claims, 20 Drawing Sheets

(56) References Cited

U.S. PATENT DOCUMENTS

| | | | | |
|---|---|---|---|---|
| 2015/0334995 A1* | 11/2015 | Cote | .................. | A01K 39/0113 |
| | | | | 119/52.4 |
| 2015/0366168 A1* | 12/2015 | Cote | .................... | A01K 39/012 |
| | | | | 119/52.2 |
| 2016/0113247 A1* | 4/2016 | McCord | ............... | A01K 5/0142 |
| | | | | 119/52.3 |
| 2016/0262357 A1* | 9/2016 | Cole | .................... | A01K 39/012 |
| 2017/0339926 A1* | 11/2017 | Cote | ................. | A01K 39/0113 |
| 2019/0159432 A1* | 5/2019 | Bruno | ................ | A01K 39/0125 |

* cited by examiner

BIRD FEEDER WITH ADJUSTABLE SHROUD

The present invention claims priority on U.S. application Ser. No. 15/932,468 filed Mar. 2, 2018, and is related to U.S. application Ser. No. 15/932,724 filed Apr. 12, 2018, U.S. application Ser. No. 15/932,980 filed Jun. 1, 2018 and U.S. application Ser. No. 15,999,997 filed Sep. 7, 2018, the contents of which are hereby incorporated by reference.

FIELD OF THE INVENTION

The present invention relates to bird feeders and more particularly, relates to an adjustable shroud for a bird feeder.

BACKGROUND OF THE INVENTION

The use of bird feeders is well known in the art. The feeding of birds, particularly during inclement weather, is widely practised. Most of the bird feeders comprise a container which will house the seeds or other bird feed and allow for distribution of the seed to the birds at positions whereby they can feed. Typically, the bird seed is allowed to feed by gravity to a position proximate to one or more bird perches upon which the bird can land and eat the seed.

Many different types of seed feeders are known and one particular type includes that which is known as "squirrel proof". These squirrel proof feeders incorporate a mechanism to prevent squirrels from feeding. Some of the mechanisms include weight sensitive technology which denies access to the seed when a weight above a certain predetermined amount lands on the perch. Other mechanisms use mechanical barriers such as baffles on poles.

In all instances, the bird feeders provide a perch area on which the birds can land and stay while they access the seed from the feeder. The perches may form a portion of the feeder itself or may be provided as a separate member.

One type of perch which is widely used is a stamped metal piece. With this process, the metal is cut or stamped and the piece is secured to the bird feeder. It has been noted by Applicant that such perches appear uncomfortable for some birds and they will not remain for very long on the perch.

SUMMARY OF THE INVENTION

It is an object of the present invention to provide a bird feeder having an adjustable piece to set the spring tension.

According to one aspect of the present invention, there is provided a bird feeder comprising a seed container, the seed container having at least one seed port to permit birds to have access to seed from the seed container, a shroud extending about the at least one seed port, the shroud being movable between a first position wherein access to the at least one seed port is enabled and a second position wherein access to the at least one seed port is denied, a base member secured to the seed container, a hollow tube extending upwardly from the base member and being located internally of the seed container, a rod extending within the hollow tube, a spring extending about a portion of the rod, the rod having a flange extending outwardly therefrom, a first end of the spring being biased against the flange, an insert secured to the base member, the insert extending upwardly into the hollow tube, a second end of the spring being biased against the insert, the rod having a lower end secured against a bottom portion of the shroud such that when a weight is placed on the shroud, the shroud moves downwardly to the second position.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
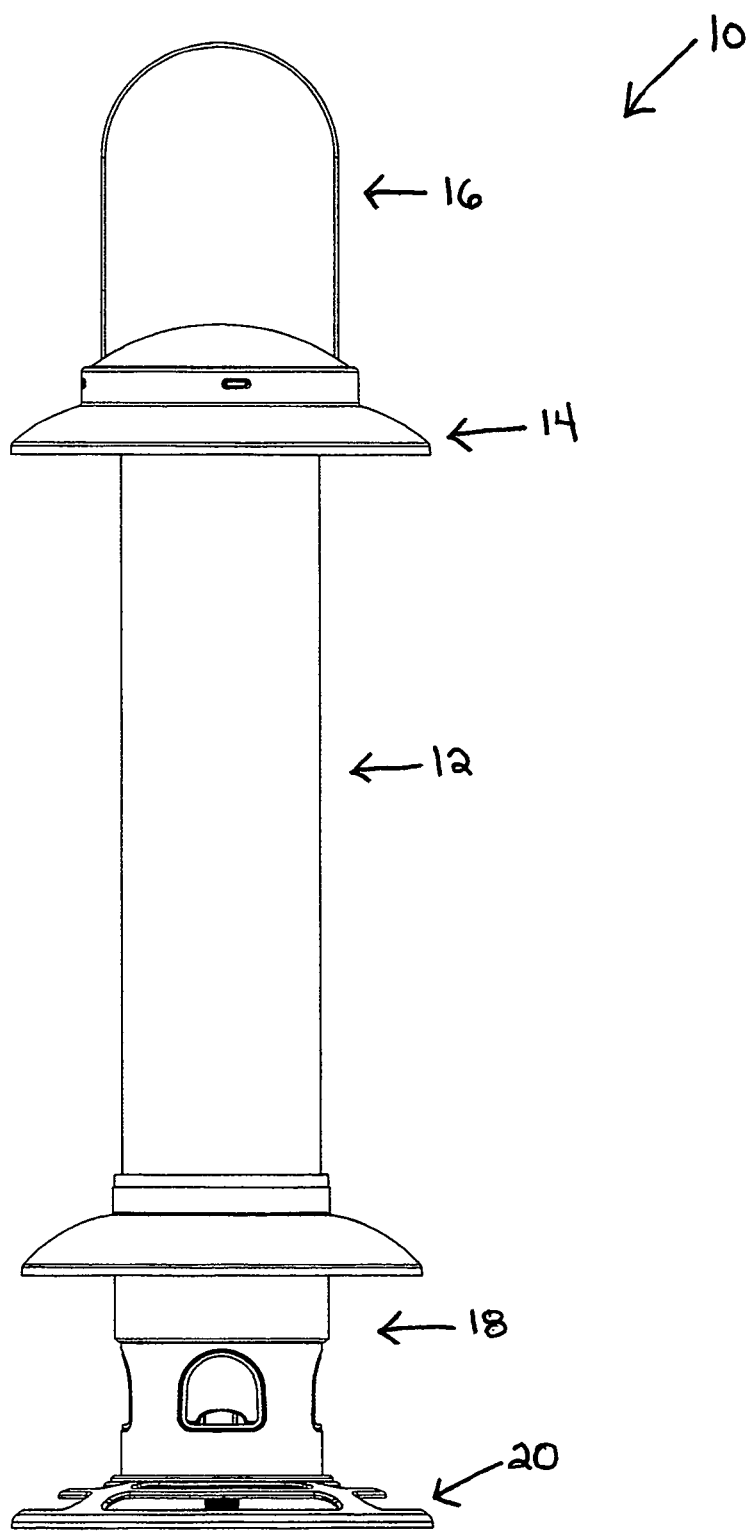
FIG. 1 is a side elevational view of a bird feeder according to one embodiment of the present invention.
Figure 2:
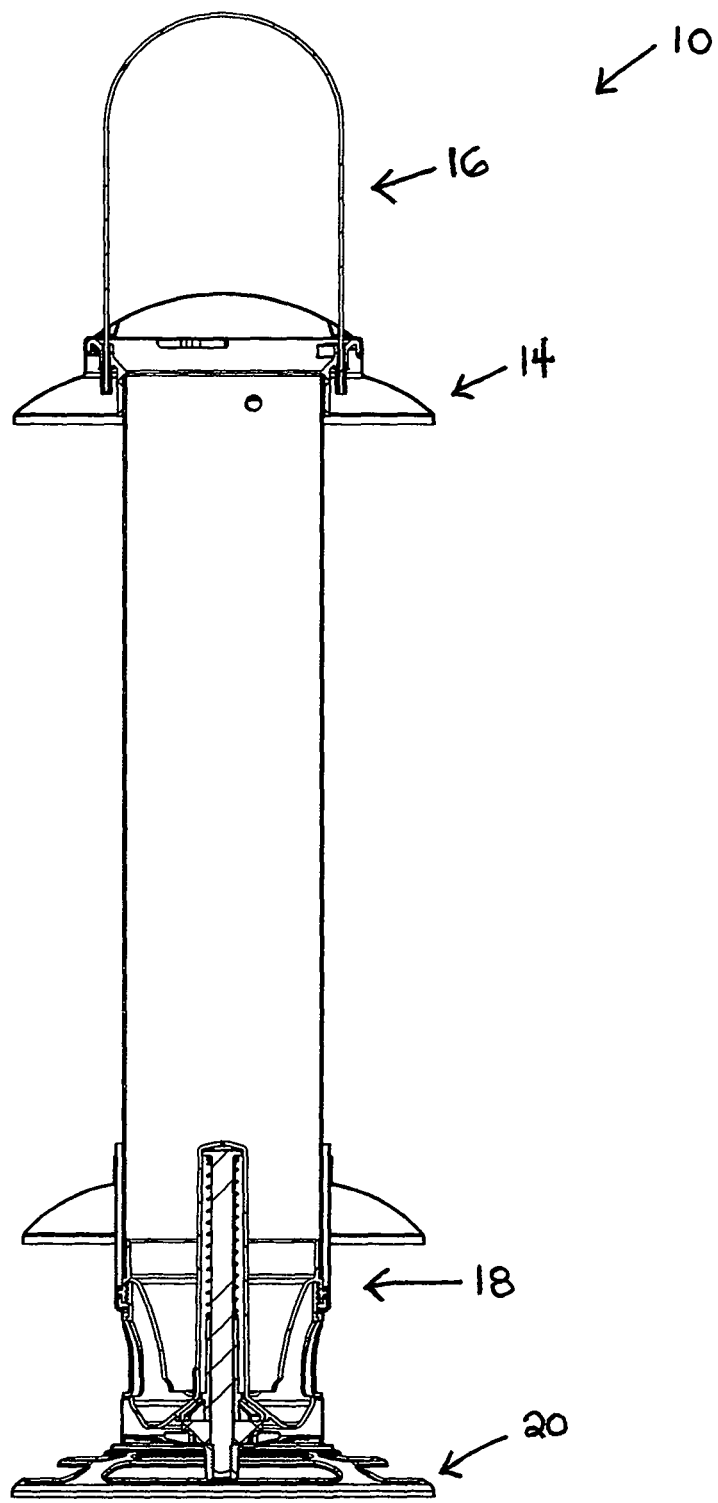
FIG. 2 is a longitudinal sectional view thereof.
Figure 3:
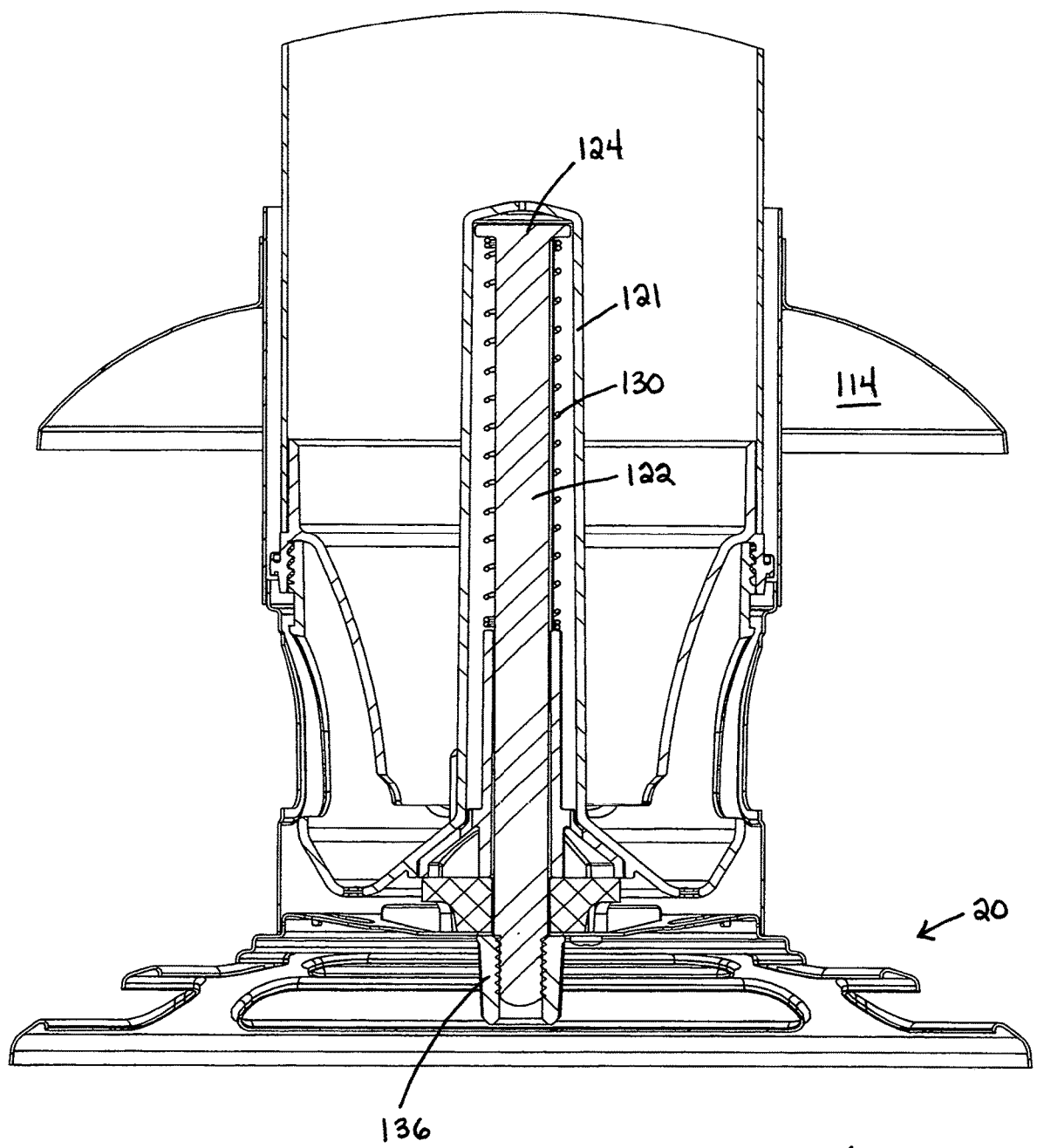
FIG. 3 is a longitudinal sectional view of the bottom portion of the bird feeder of FIG. 1.

Referring to the drawings in greater detail and by reference characters thereto, there is illustrated a bird feeder of the squirrel resistant type and which bird feeder is generally designated by reference numeral 10.

Bird feeder 10 is comprised of a seed tube generally designated by reference numeral 12, a cover generally designated by reference numeral 14, a hanger generally designated by reference numeral 16, a shroud generally designated by reference numeral 18, and a stand (forming a portion of shroud 18) generally designated by reference numeral 20. Bird feeder 10 also includes a funnel generally designated by reference numeral 22 and a seed tube base generally designated by reference numeral 24.

Seed tube 12 defines a seed container having a cylindrical wall 28. Seed tube 12 has an open upper end 30 and an open lower end 32.

Located at open upper end 30 is a an upper ring 34 which sits on seed tube 12. Upper ring 34 includes a lower circular wall 36 and an upwardly tapering wall 38. Upper ring 34 also includes an upper side wall 40 which has protrusions 42 extending outwardly therefrom. Preferably, there are provided a pair of such protrusions 42 each being diametrically opposed to the other. A pair of recesses 44 are provided in upper side wall 40 for reasons which will become apparent hereinbelow. Also, an upwardly extending wall 46 defines a slot 48. There are two such structures located on upper ring 34.

Figure 8:
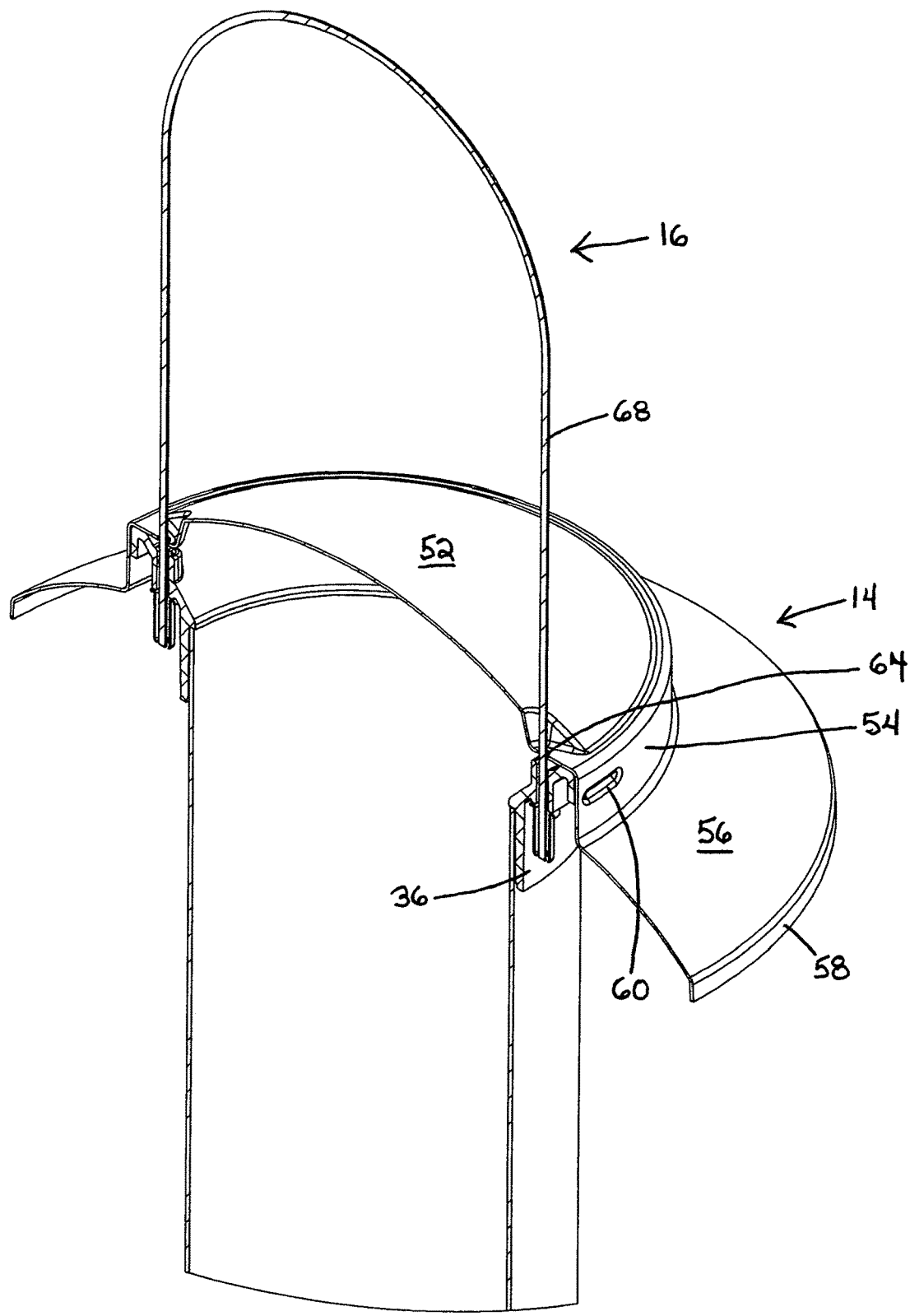
FIG. 8 is an enlarged perspective sectional view of the upper portion of a bird feeder according to an embodiment of the present invention.
Figure 9:
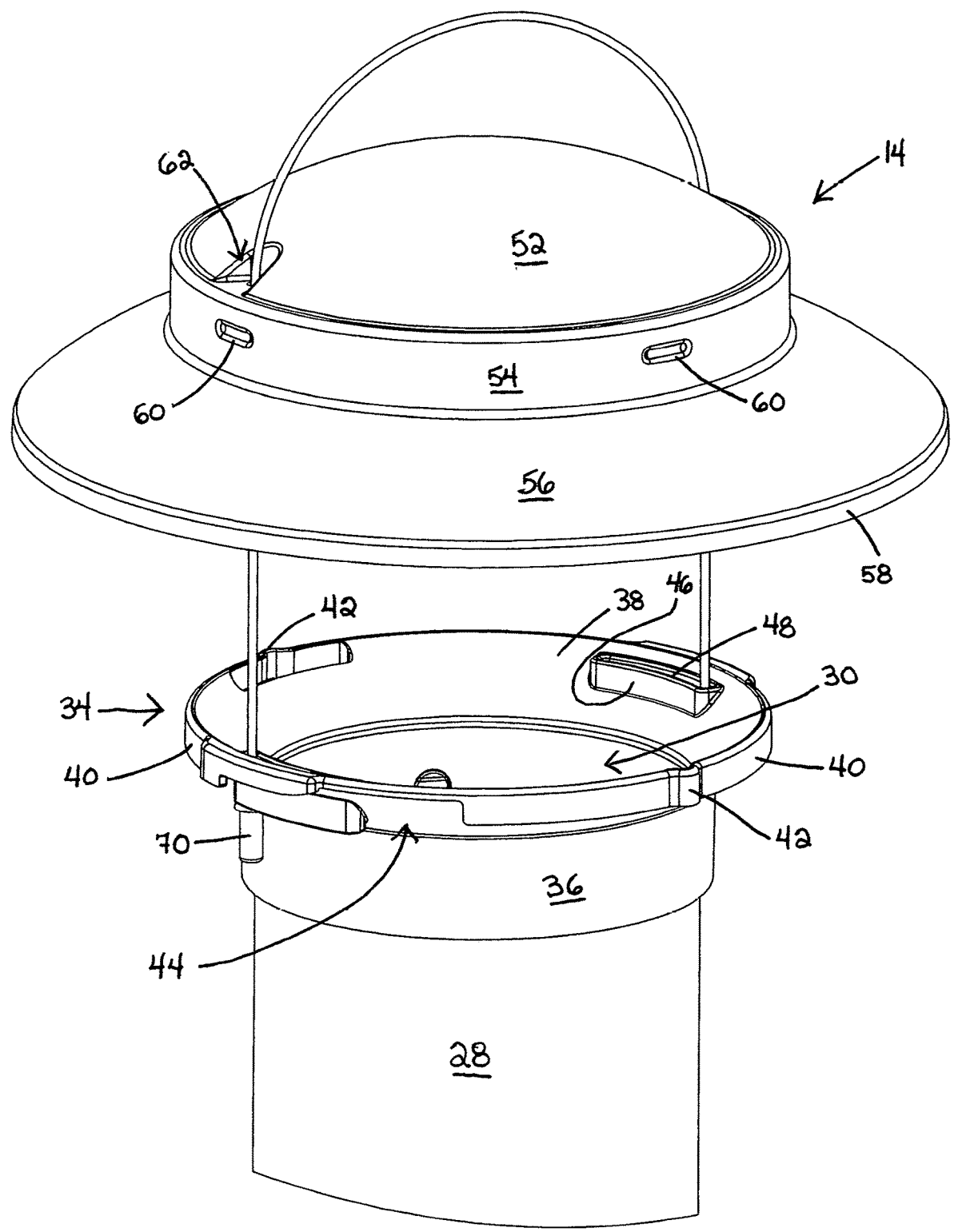
FIG. 9 is an enlarged perspective view of the upper portion of a bird feeder when the cover is not secured to the bird feeder.
Figure 10:
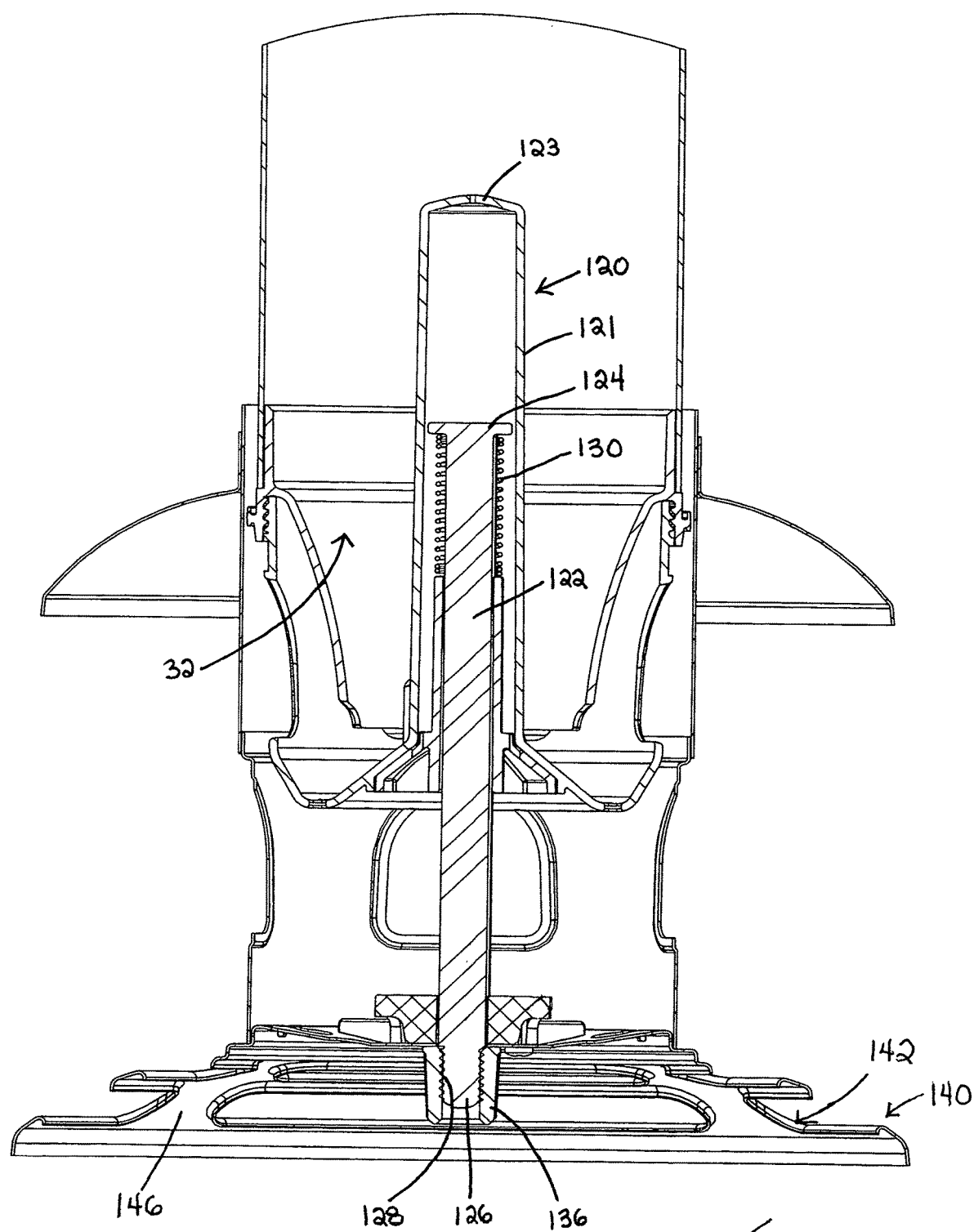
FIG. 10 is a further sectional view of the bird feeder when the shroud is misaligned with the seed tube.
Figure 11:
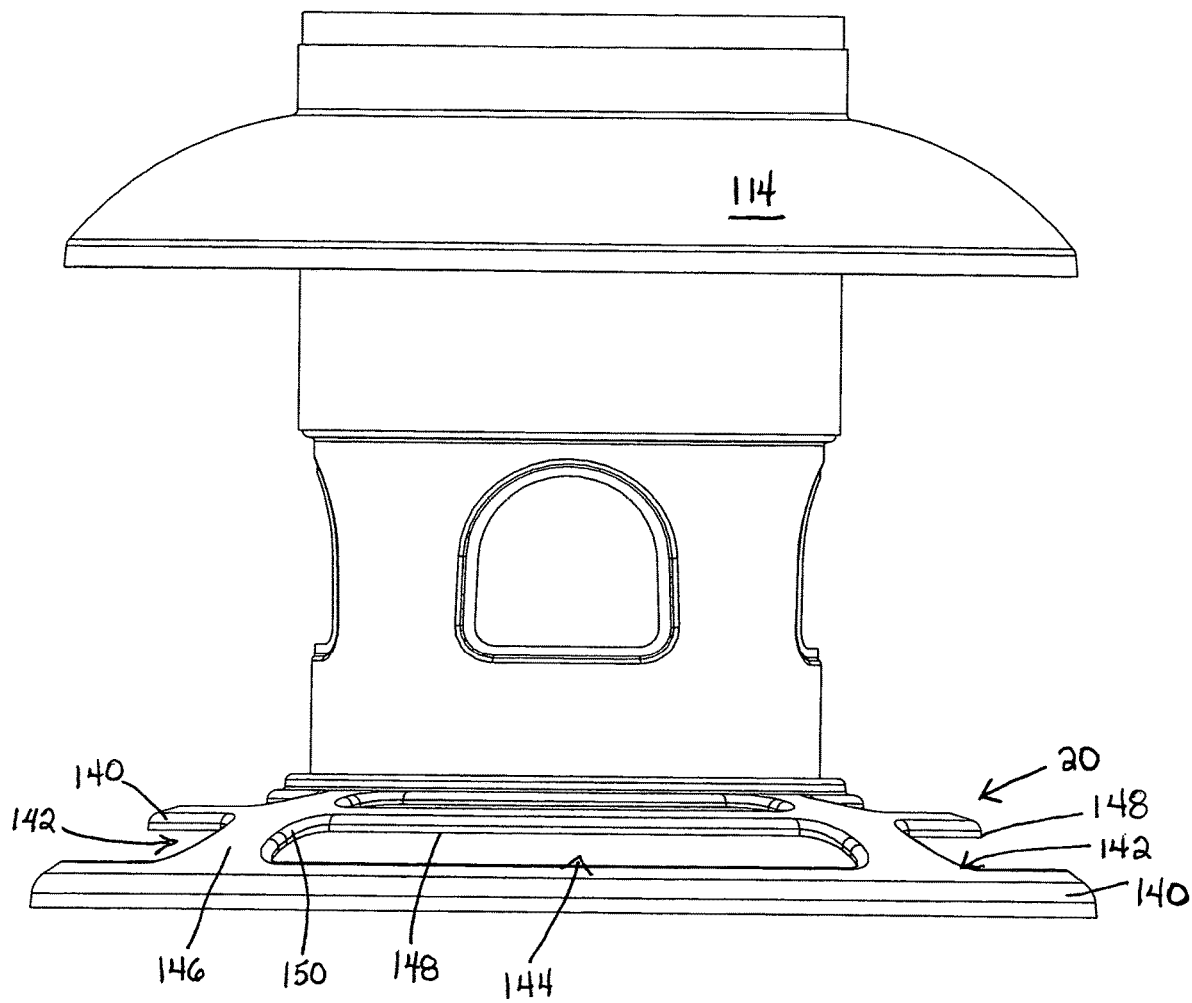
FIG. 11 is a side elevational view of the lower portion of the bird feeder.
Figure 12:
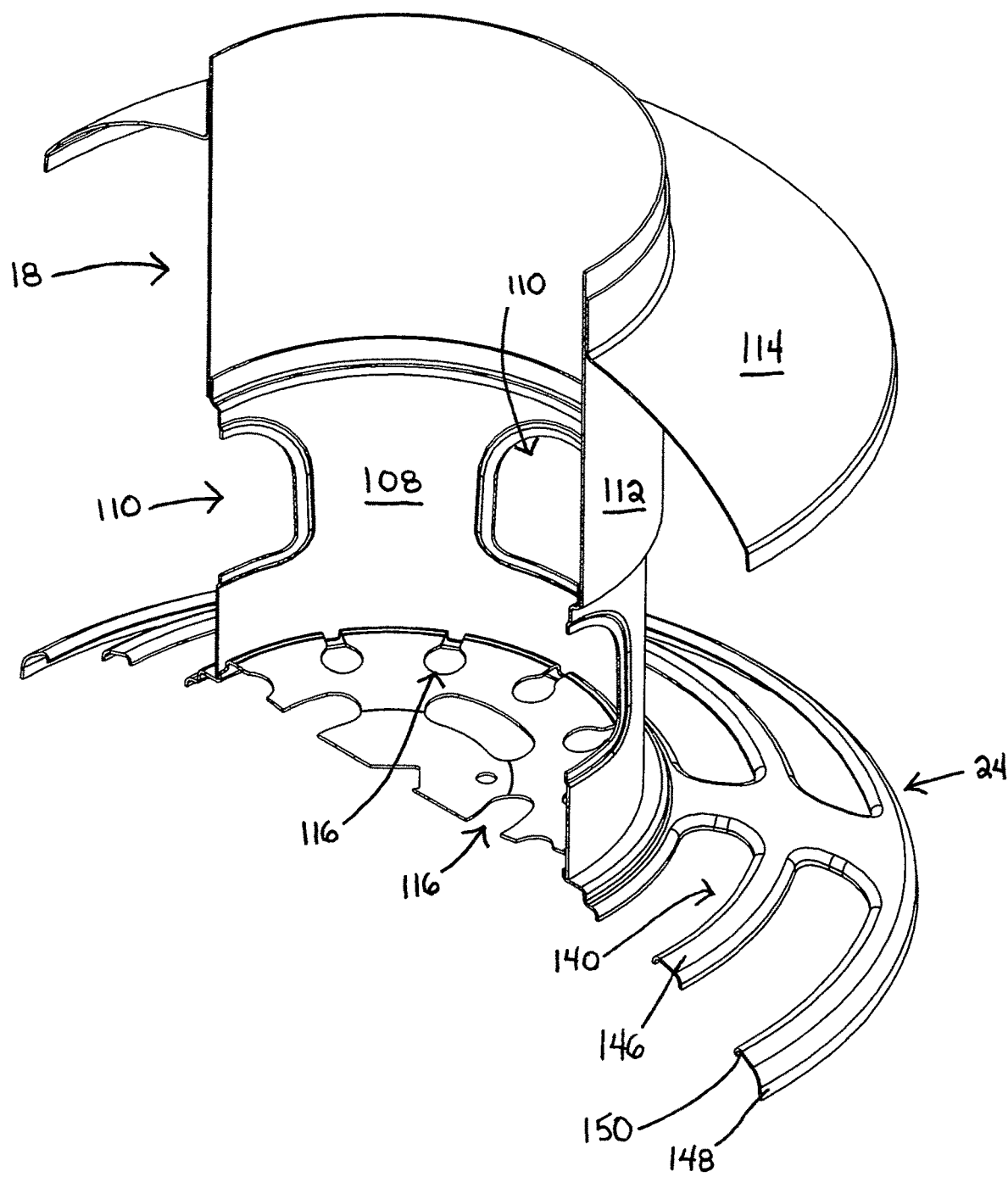
FIG. 12 is a side cutaway view of the lower portion of the bird feeder.

Cover 14, as may be seen in FIGS. 8 and 9, has a domed top wall 52 and a vertical side wall 54 extending downwardly therefrom. There is also provided a sloping wall 56 which terminates in a drip edge 58. Protrusions 60 are provided on the inner surface of vertical side wall 54. Preferably four such protrusions are provided. A pair of diametrically opposed protrusions 60 are designed to engage with protrusions 42 to hold the cover in position. A second pair of protrusions 60 engage within recesses 44 as is known in the art. Cover 14 also has a pair of recesses 62 formed in domed top wall 52 with an aperture 64 being located thereat.

Figure 15:
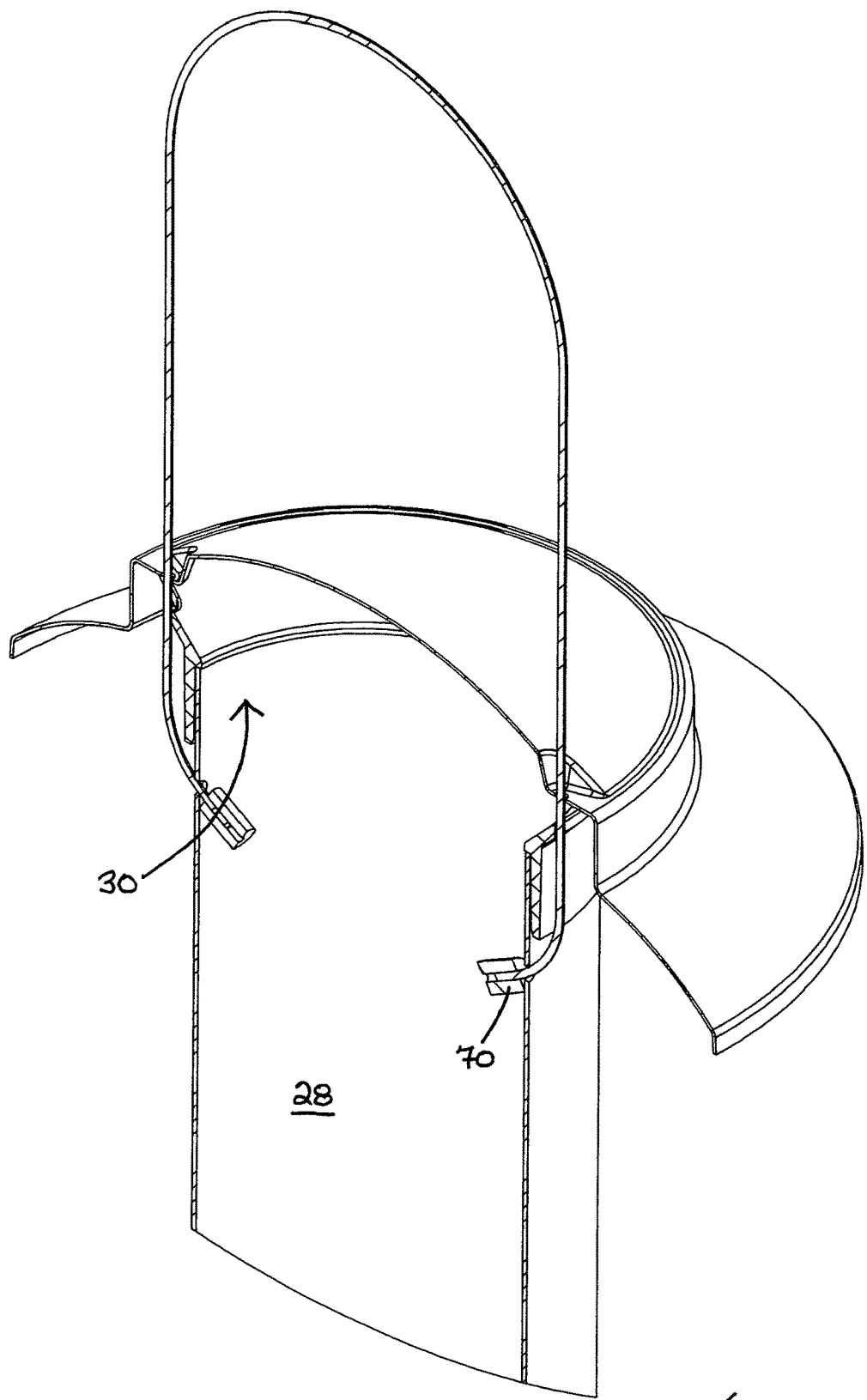
FIG. 15 is a perspective cutaway view of the upper portion of a further embodiment of the bird feeder.
Figure 16:
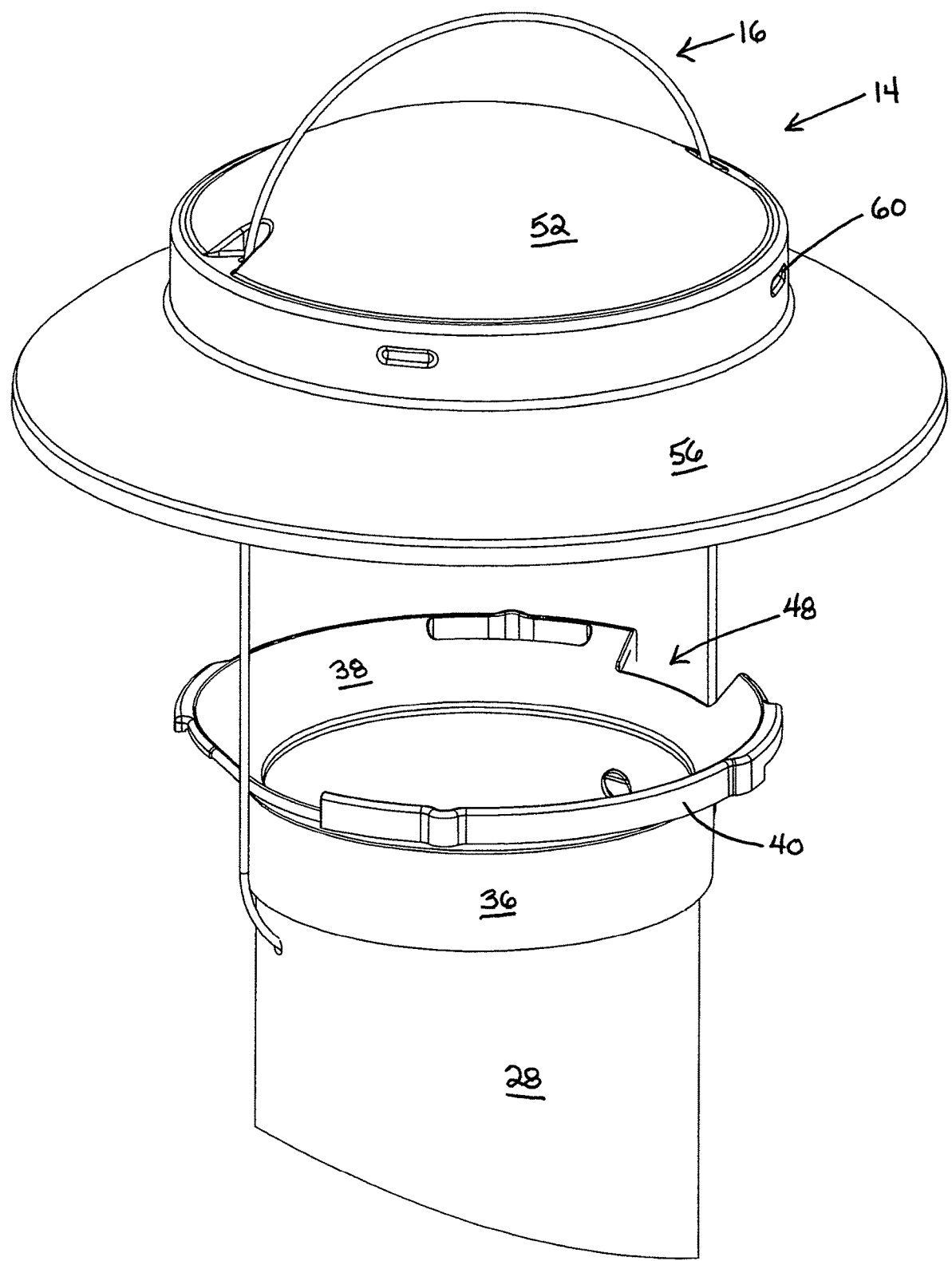
FIG. 16 is a partially exploded view of the upper portion of the bird feeder as shown in FIG. 15.

Hanger 16 comprises a relatively stiff wire 68. Wire 68 passes through aperture 64 and is provided with an enlarged portion 70 which sits under upper ring 34 and is thereby retained in position. In an alternative embodiment illustrated in FIGS. 15 and 16, wire 68 passes through cylindrical wall 28 with enlarged portion 70 retaining the wire.

Figure 17:
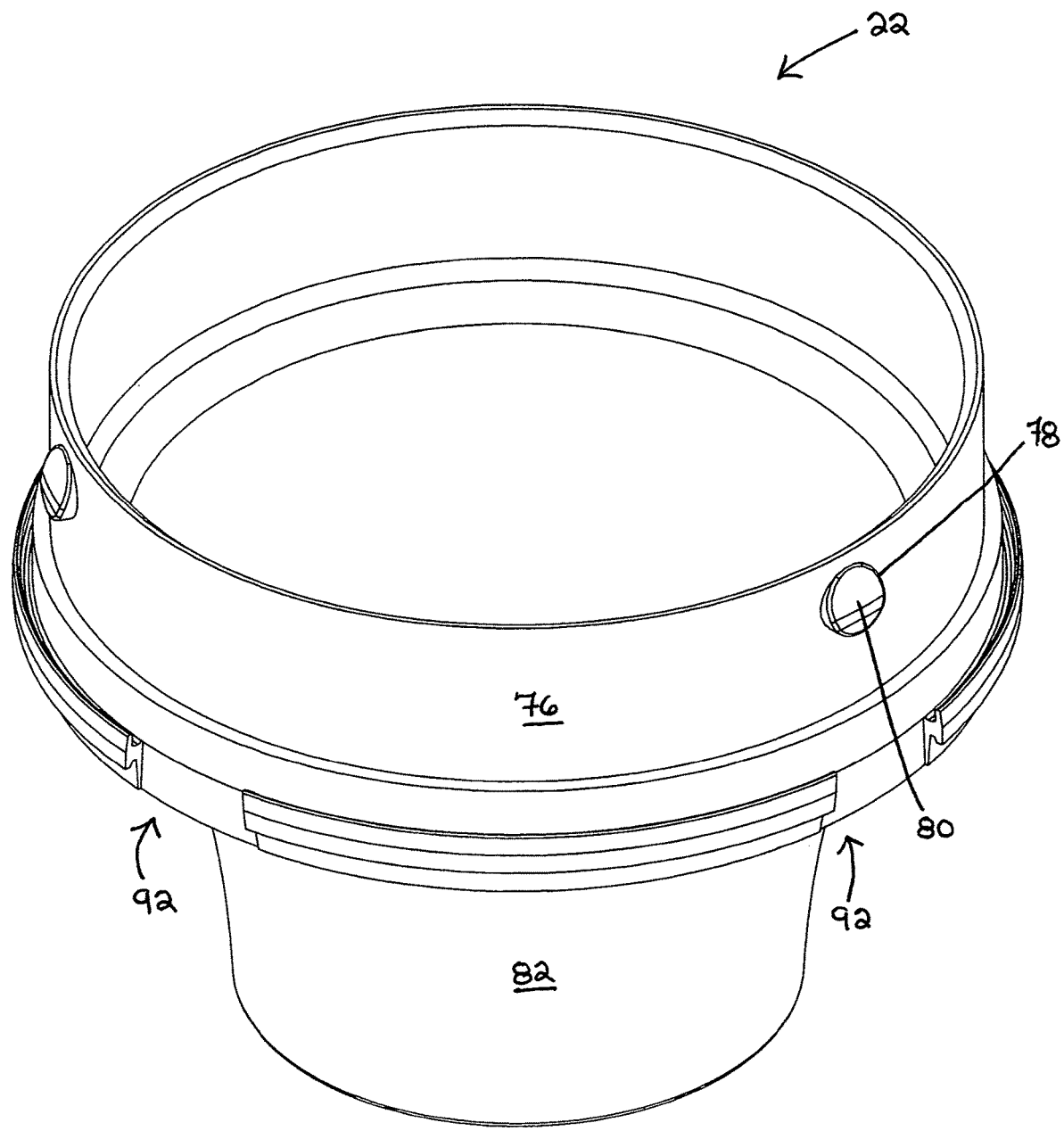
FIG. 17 is a perspective view of the funnel member of the bird feeder.
Figure 18:
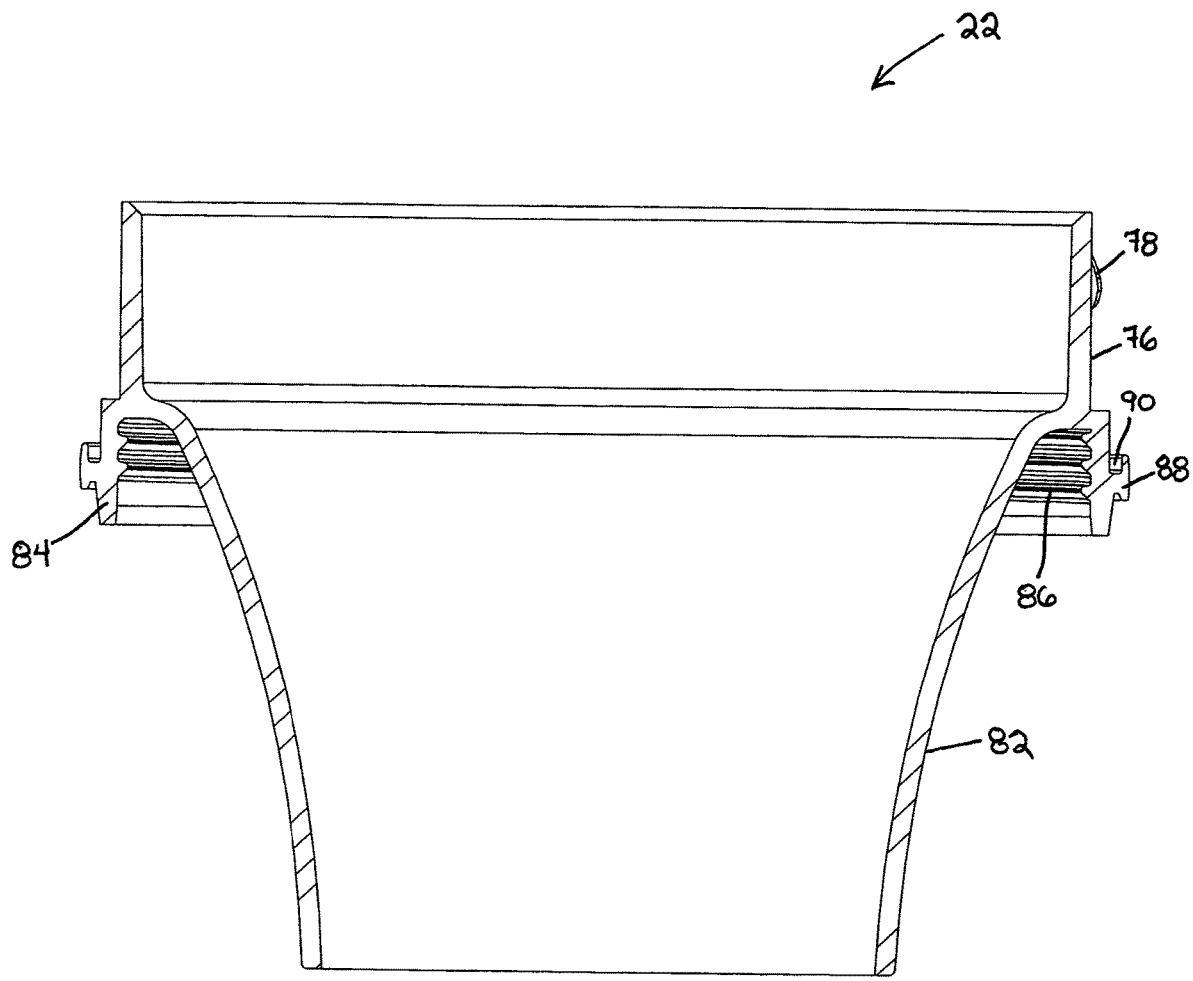
FIG. 18 is a sectional view thereof.
Figure 19:
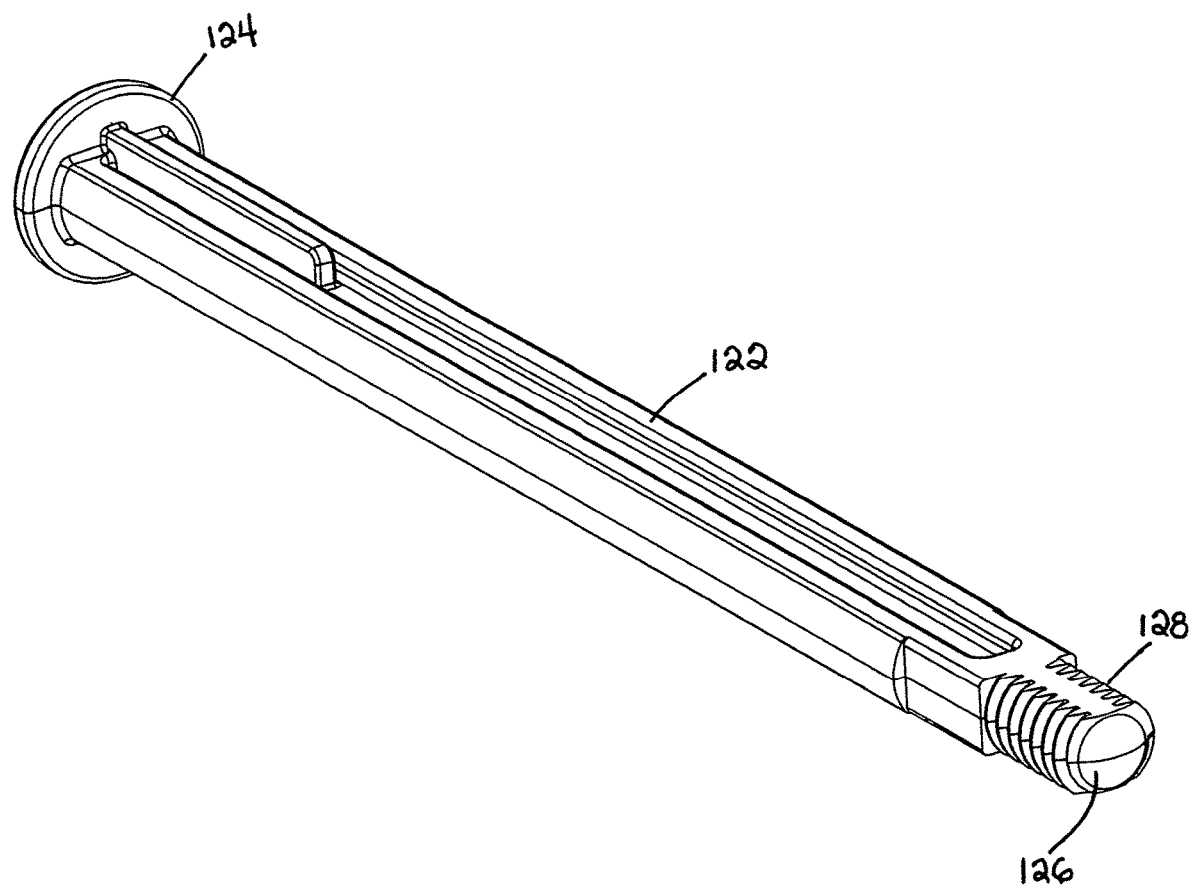
FIG. 19 is a perspective view of an inner rod member of the bird feeder.
Figure 20:
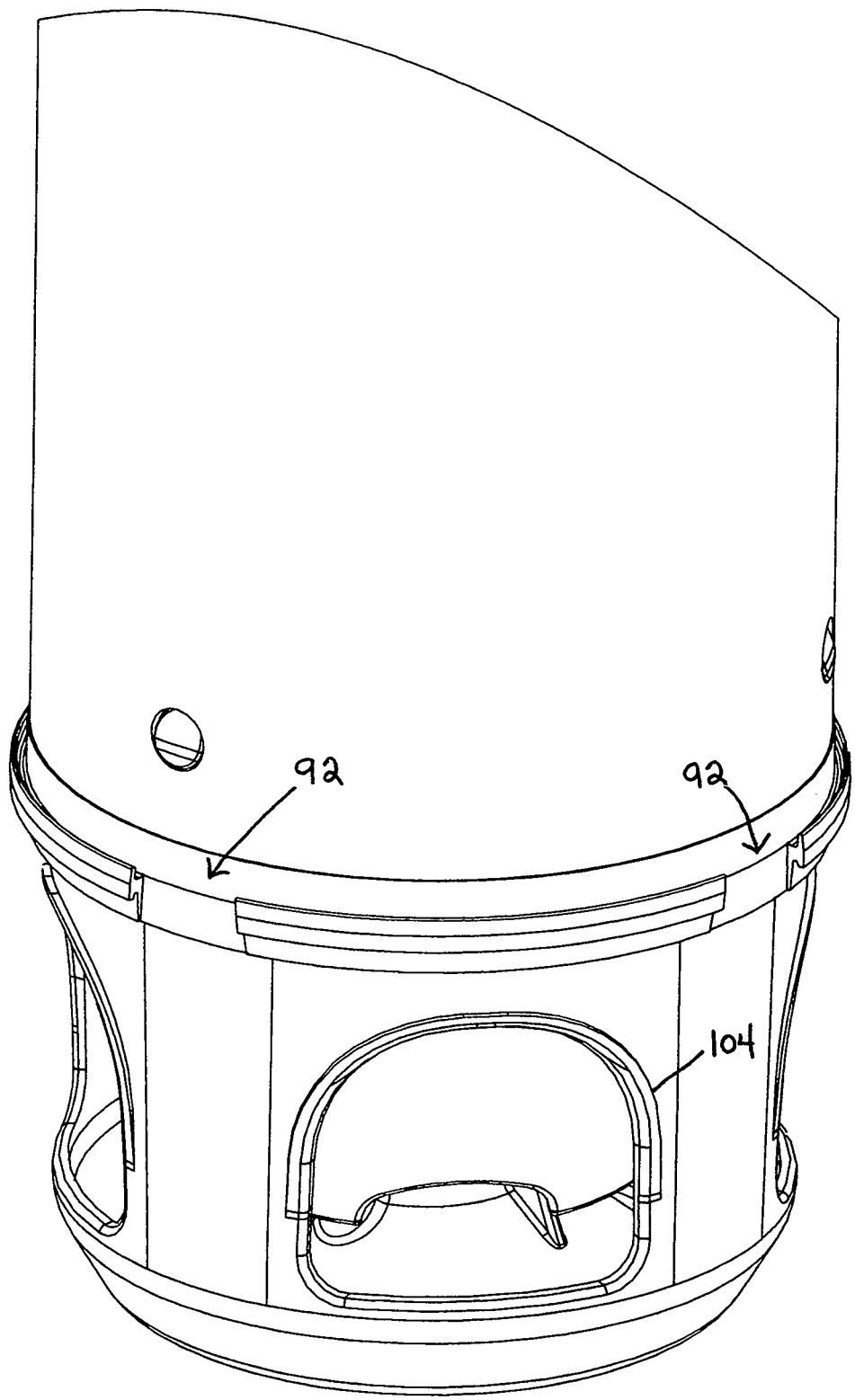
FIG. 20 is a perspective view of the base member and securement thereof to the funnel member and seed tube.

Funnel 22, best illustrated in FIGS. 17 and 18, has an upper wall 76 with a plurality of protrusions 78 being formed thereon. Each protrusion 78 is designed to fit within an aperture formed in the bottom portion of cylindrical wall 28 of seed tube 12. To aid in locking and unlocking, a sloping wall 80 is provided thereon.

Funnel 22 also has a lower wall 82 which is funnel shaped to help direct seeds as will be discussed hereinbelow. A middle wall section 84 extends downwardly from upper wall 76 and is spaced from lower wall 82. Threads 86 are provided on the interior of middle wall 84. A drainage member 88 extends outwardly from middle wall section 84 and has a U-shaped drainage channel 90 formed therein for reasons which will become apparent hereinbelow. It will be noted that there are gaps 92 between sections of middle wall section 84 to direct any water away from the feed openings.

Figure 13:
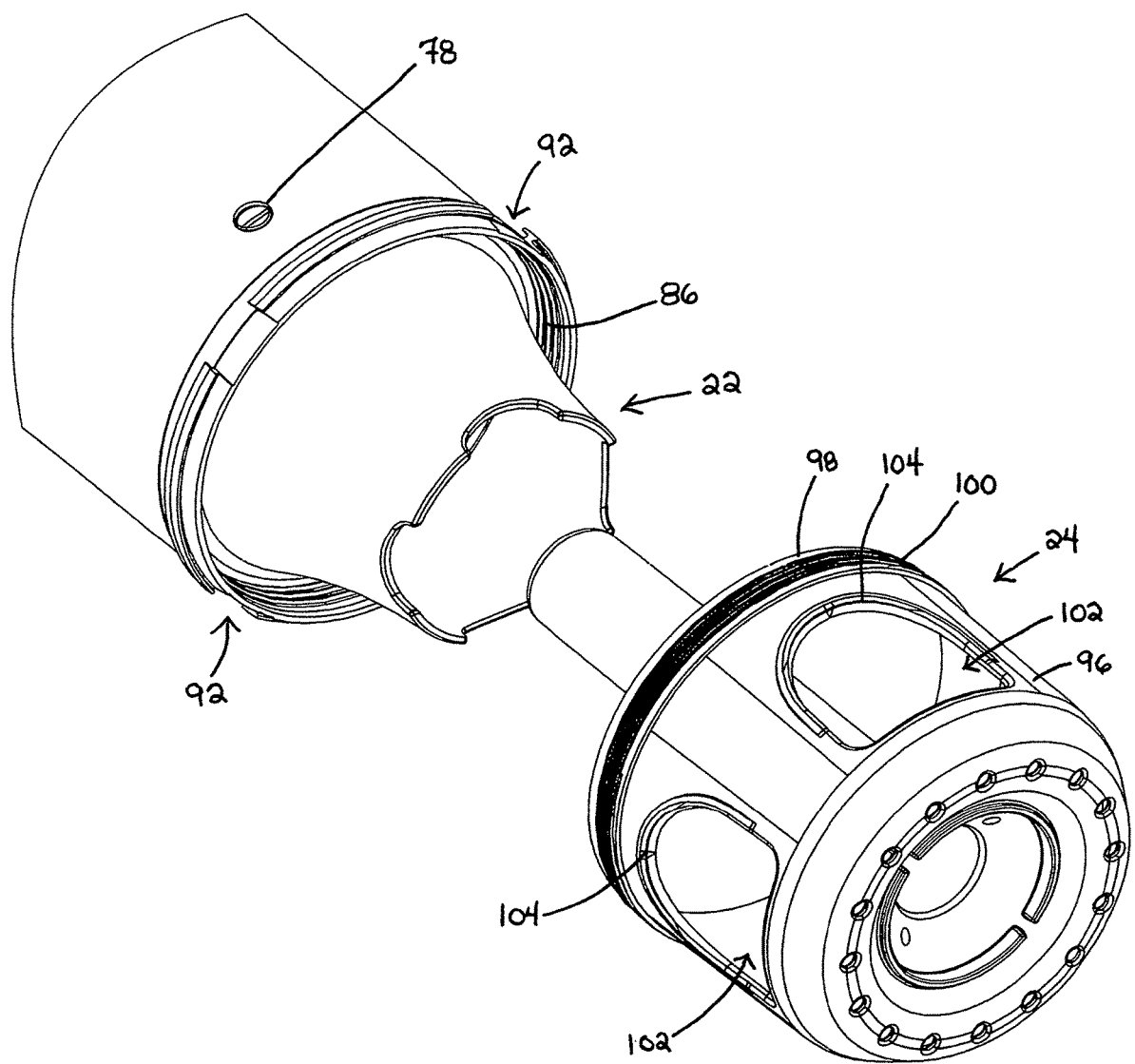
FIG. 13 is an exploded view showing the funnel and base portion of the bird feeder.
Figure 14:
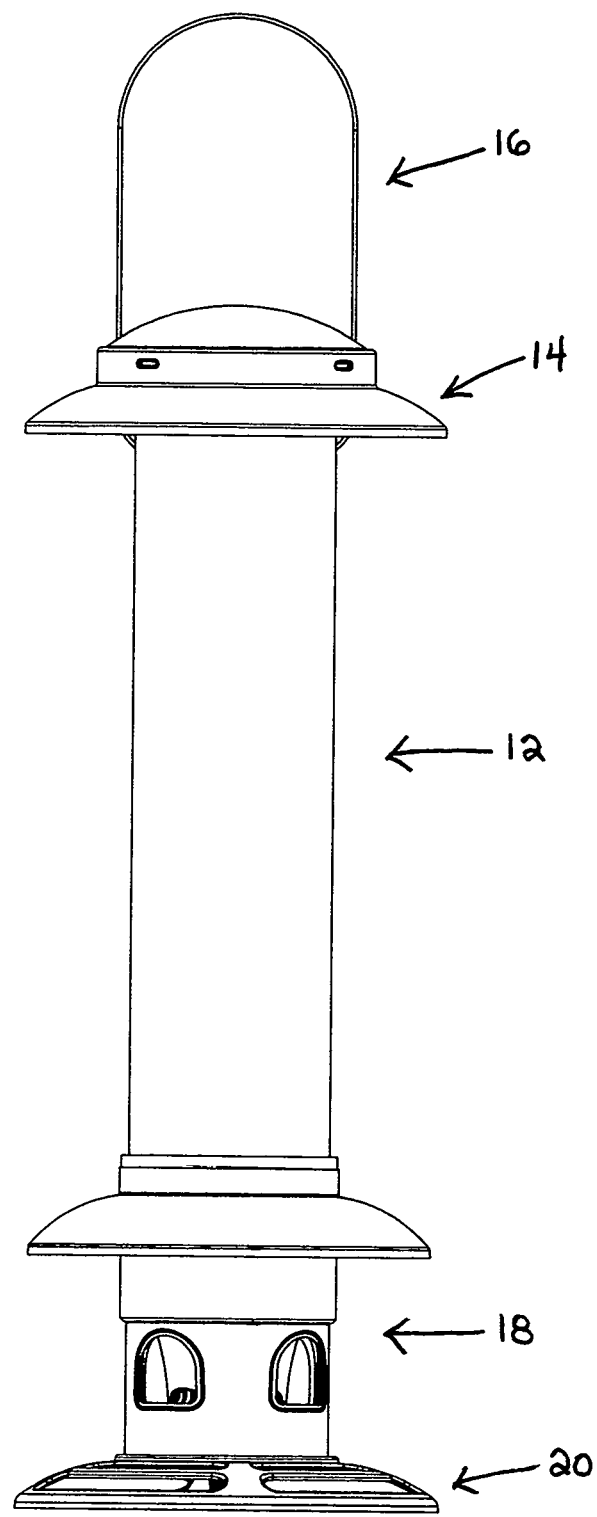
FIG. 14 is a side elevational view of the bird feeder.

Seed tube base 24, as may be seen in FIG. 13, has an upper side wall 98 which has a plurality of threads 100 thereon. Threads 100 are designed to engage with threads 86 formed on middle wall section 84 of funnel 22. A plurality of feed openings 102 are provided in side wall 96 of seed tube base 24. As will be noted, there is provided a rim protrusion 104 which extends partially about the upper portion of feed openings 102. This arrangement allows rainwater to pass to the side of the feed openings 102.

Shroud 18 has a lower side wall 108 with a plurality of feed openings 110 therein. An upper side wall 112 is directed to lower side wall 108. A baffle 114 extends circumferentially around the shroud and is located on upper side wall 112 such that it is above feed openings 110 to provide protection from the weather such as rain. It is obviously important that the baffle is located above the feed openings while also being close to the feed openings. An interior bottom wall has a plurality of drainage apertures 116 formed therein.

Located inwardly of the seed tube base is a longitudinally extending post generally designated by reference numeral 120. Post 120 is formed of a cylindrical wall 121 having a top wall 123. Located internally of post 120 is a rod 122 which has a flange 124 formed at the top end thereof. A lower portion 126 of rod 122 has screwthreads 128 formed thereon. Extending about rod 122 is a coil spring 130 which has a first end biased against top flange 124. An insert 132 is provided and is connected to the seed tube base by means of screws 134. A cap 136 is screwthreadedly engaged with lower portion 126 by screwthreaded engagement with screwthreads 128.

Figure 7:
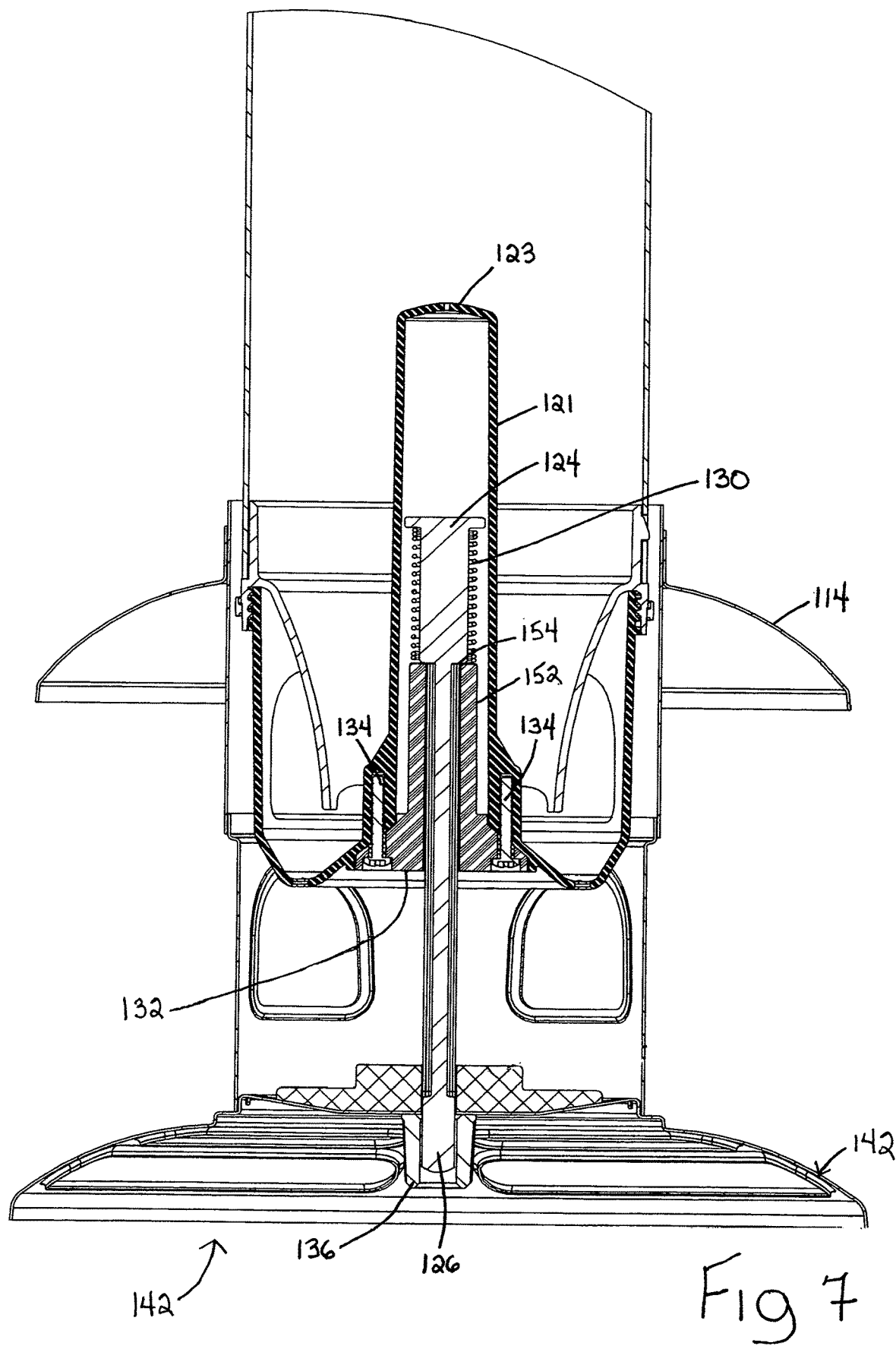
FIG. 7 is a longitudinal sectional view of the bottom portion of a bird feeder when the shroud is lowered, denying access to the seed within the bird feeder.

Insert 132, as may be seen in FIG. 7, has a cylindrical wall 152 which extends upwardly within post 120. Insert 132 also has a top wall 154 on cylindrical wall 152 and which top wall 154 functions as a stop to bias the lower end of coil spring 130.

An advantage of insert 132 is that it permits different sizing to be used to vary the compression of coil spring 130. Thus, if spring 130 happens to be of a different strength than normal, the length of cylindrical wall 152 may be varied. Insert 132 could also be used to vary the weight needed to move shroud 18 downwardly.

Figure 4:
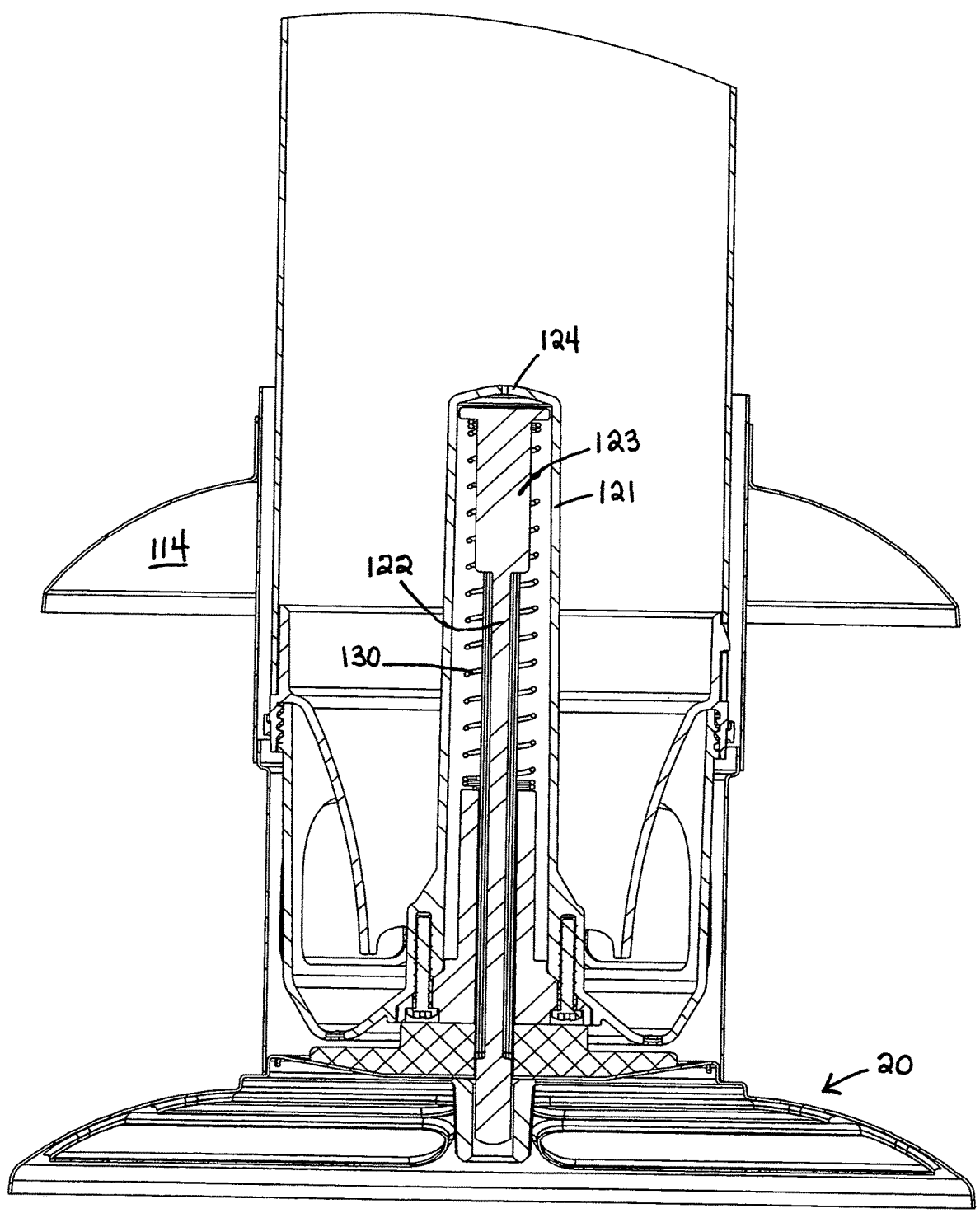
FIG. 4 is a longitudinal sectional view of the bottom portion of a further embodiment of a bird feeder according to the present invention.
Figure 5:
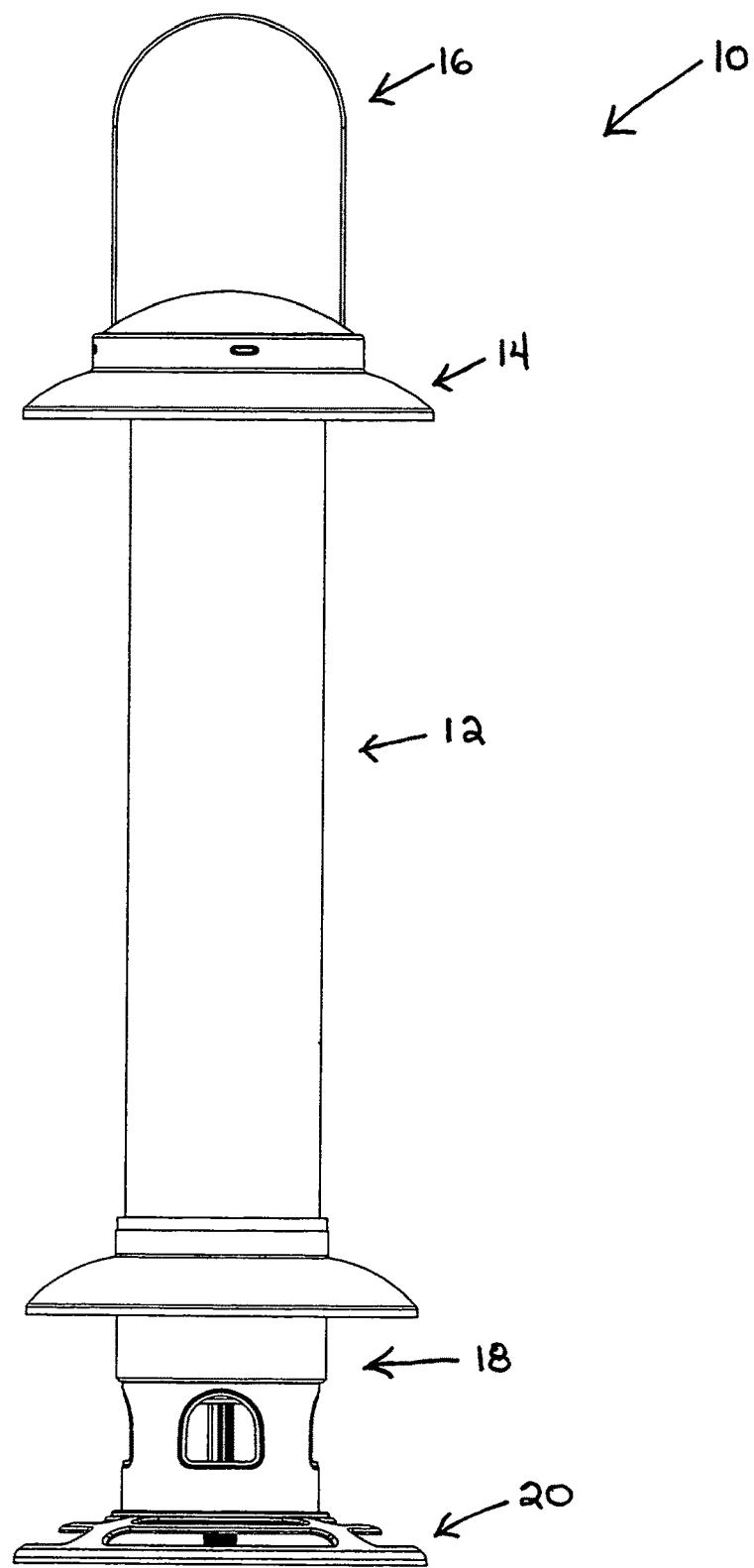
FIG. 5 is a side elevational view of the bird feeder of FIG. 4.
Figure 6:
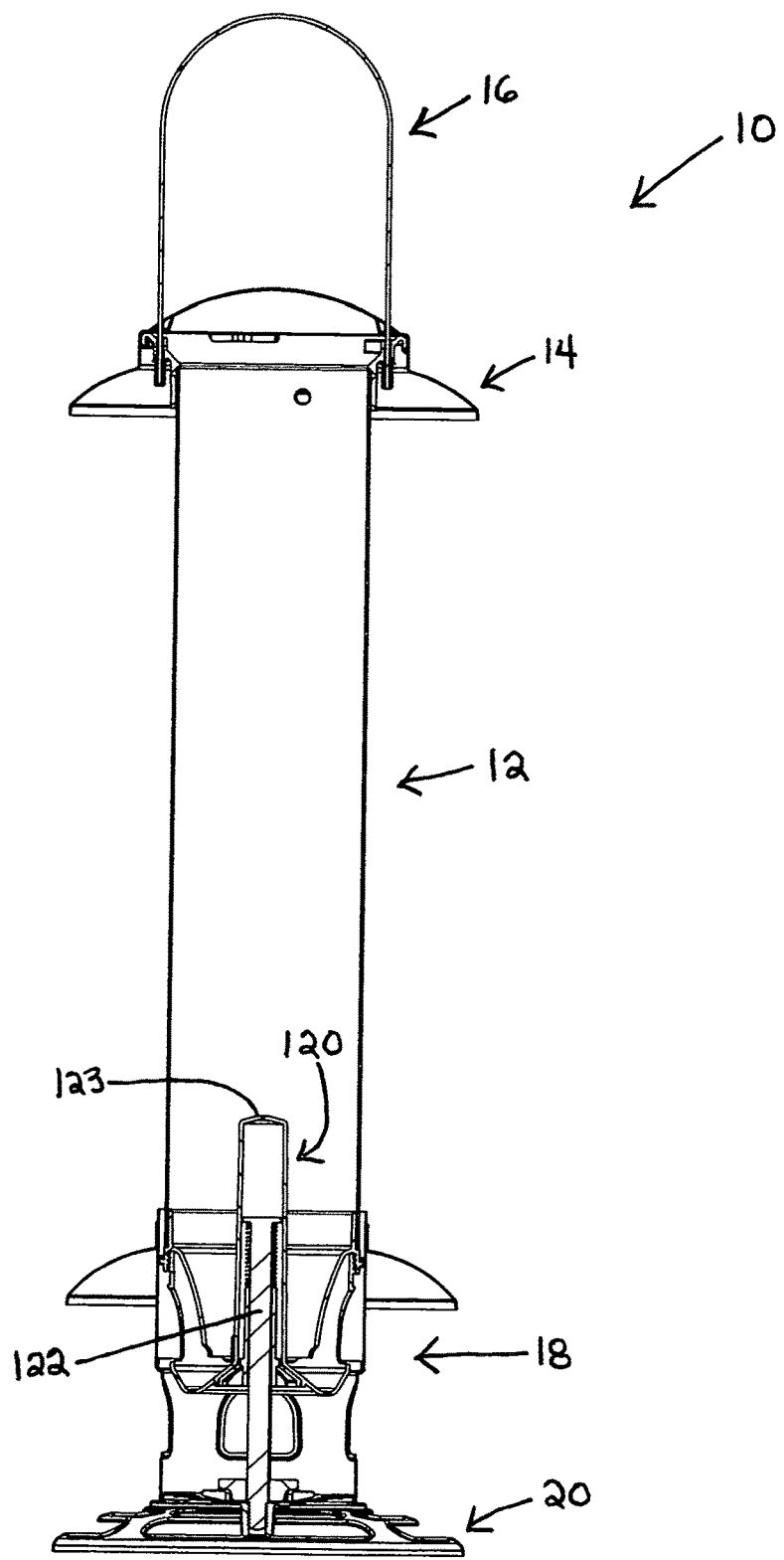
FIG. 6 is a longitudinal sectional view of the bird feeder of FIG. 5.

In the embodiment of FIG. 4, rod 122 has an enlarged portion 123 at its upper end.

Stand 20, as seen in the drawings, also functions as a perch for the birds. Stand or perch 20 is comprised of a plurality of circular elements 140 which extend completely around the shroud. In the illustrated embodiment, there are two such circular elements although more may be utilized if so desired. A plurality of radial elements 142 extend between and connect circular elements 140. A plurality of gaps 144 are formed by this structure.

Each of circular elements 140 and radial elements 142 is designed to have somewhat flat upper surface 146. On each side of upper surface 146, a pair of side walls 148 extend downwardly. The transition between upper surface 146 and side walls 148 is provided by arcuate corners 150.

The arrangement is such that no sharp corners are present when the birds land on circular elements 140 or radial elements 142. The birds appear to be more comfortable with this arrangement It will be understood that the above described embodiment is for purposes of illustration and that changes and modifications may be made thereto without departing from the spirit and scope of the invention.

I claim:

1. A bird feeder comprising:
   a seed container, said seed container having at least one seed port to permit birds to have access to seed from said seed container;
   a shroud extending about said at least one seed port, said shroud being movable between a first position wherein access to said at least one seed port is enabled and a second position wherein access to said at least one seed port is denied;
   a base member secured to said seed container, a hollow tube extending upwardly from said base member and being located internally of said seed container, a rod extending within said hollow tube, a spring extending about a portion of said rod, said rod having a flange extending outwardly therefrom, a first end of said spring being biased against said flange;
   an insert comprising a lower end and a top wall, said lower end of said insert being secured to a bottom end of said base member, said insert extending upwardly into said hollow tube, a second end of said spring being biased against said top wall of said insert, said rod having a lower segment secured against a bottom portion of said shroud such that when a weight is placed on said shroud, said shroud moves downwardly to said second position.

2. The bird feeder of claim 1 wherein said seed container comprises a cylindrical seed tube formed of a transparent material.

3. The bird feeder of claim 1 wherein said seed container includes a removable cover mounted on an upper end of said seed container.

4. The bird feeder of claim 1 wherein said base member includes a bottom wall and a cylindrical side wall, a plurality of ports formed in said cylindrical side wall.

5. The bird feeder of claim 4 wherein said bottom wall of said base member has a plurality of drainage apertures formed therein.

6. The bird feeder of claim 1 wherein said lower end of said insert is mechanically secured to said bottom end of said base member.

7. The bird feeder of claim 6 wherein said lower end of said insert is secured by screws to said bottom end of said base member.

8. The bird feeder of claim 1 wherein said rod is rectangularly shaped and is non rotatable within said hollow tube.

9. The bird feeder of claim 1 wherein said rod has a screwthreaded end, a cap being secured to said screwthreaded end.

* * * * *